3,291,076
BLENDER AND PROCESS
James D. Flanigan and Kenneth A. Hollowell, Greenville, Ill., assignors, by mesne assignments, to Air Products and Chemicals, Inc., Allentown, Pa., a corporation of Delaware
Filed Aug. 23, 1963, Ser. No. 304,200
6 Claims. (Cl. 107—1)

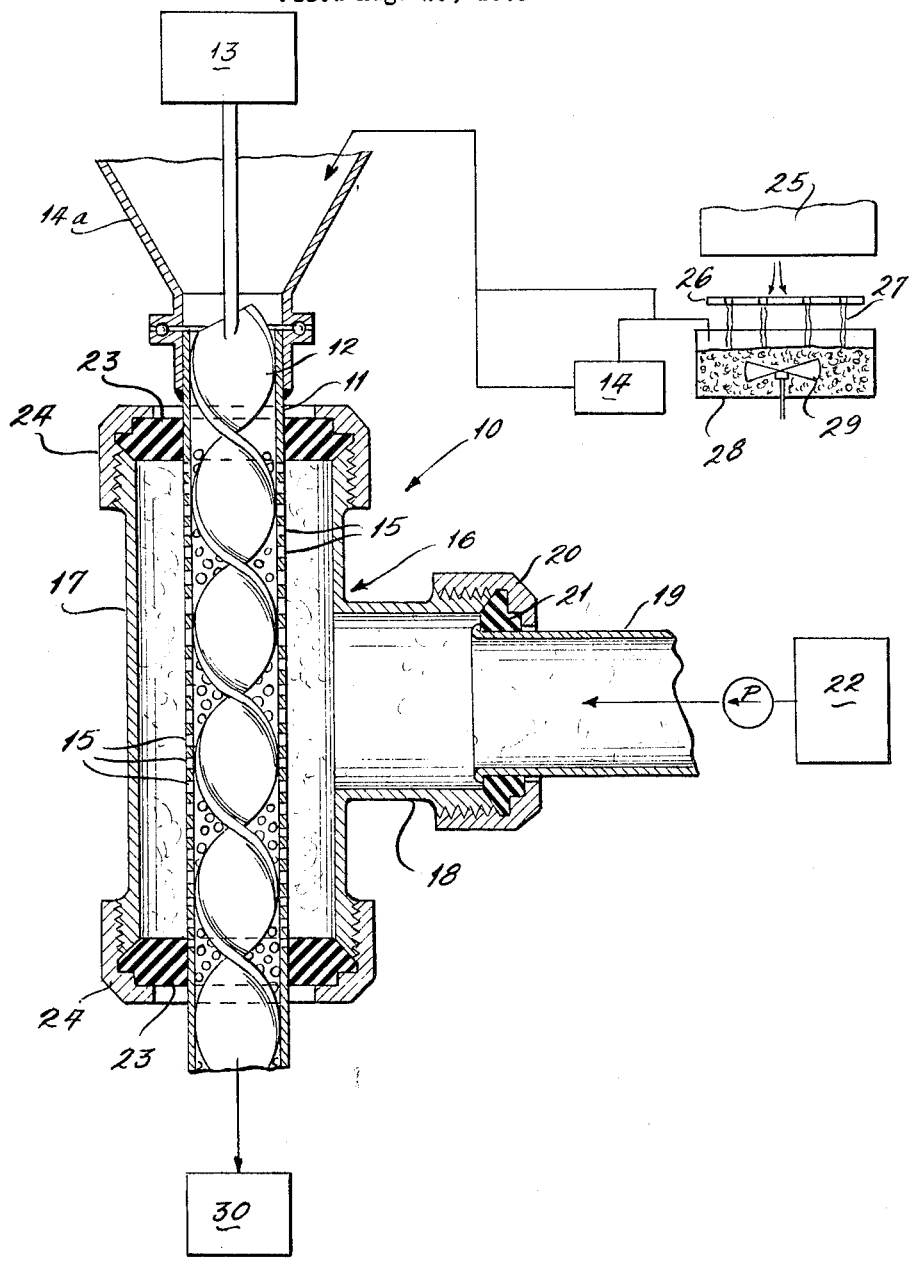

The present invention relates to a blending device, and method of blending, and particularly relates to a structure for and method of blending a semi-fluid mass with deep frozen particulate materials, and to a method of forming the particulate materials.

There are numerous devices available for blending discrete particles with fluid material, however, none of the pressently available machines have proven satisfactory for continuously blending deeply frozen particles with a thick, semi-fluid mass. The extreme coldness of the subcooled particles tends to cause the underfrozen material to harden in conventional blending apparatus, which causes the apparatus to cease functioning.

Accordingly, one of the principal objects of the present invention is to provide a blender whereby deeply frozen subcooled particles can be blended uniformly with a semi-fluid mass.

Another object of the present invention comprises a structure for blending discrete particles with a thick viscous material in a continuous and efficient manner.

Another object of the present invention is to provide a blending machine having a positive feed of additive and blended material through the blending zone and out of the machine, with the inner walls of the blender being continuously scraped.

A further object of the present invention is to provide a blending apparatus wherein a semi-fluid mass is forced into a blending zone at a plurality of locations and is there blended with discrete particles and positively moved from the blending zone by a rotating screw.

Another object is to provide a method of preparing and blending a deeply frozen, subcooled, particulate material in which the material is extruded in spaghetti-like ribbon form into a bath of liquid nitrogen or like cyrogenic substance, and the resultant brittle particles are broken by simple stirring into proper size particles for blending.

These and other objects and advantages will become apparent hereinafter.

The present invention comprises a blending device including a blending tube housing an auger blender connected to a source of additive and provided with a zone of perforations for receiving a supply of thick viscous material, said auger scraping the inner walls of the inner tube and positively expelling the blended material therefrom. The present invention also includes a process of preparing and blending a subcooled particulate material with a semi-fluid mass as hereinafter described and claimed.

The drawing is a vertical sectional view of the present invention, and shows the process of blending diagrammatically.

The present invention comprises a blending apparatus 10 including an inner blending tube 11, in which is mounted an auger type blender 12 driven by a drive means 13 (diagrammatically illustrated for simplicity) and adapted to positively feed particulate material from an insulated supply source 14 (also shown diagrammatically) through the blending tube 11. A funnel 14a communicates with the open top of the blending tube 11 and is adapted to be connected to a source of additive 14. The additive preferably is a deeply frozen, particulate, subcooled foodstuff such as fruit juice, ice cream, fruit pieces, etc. The process of preparing the particulate material will be described more fully hereinafter. The auger 12 snugly fits within and scrapes the inner surface of the blending tube 11 during its rotation. Thus, the blended material does not have an opportunity to accumulate on the inner surface of the blending tube 11.

A zone of perforations 15 is provided in the blending tube 11 and is enclosed by a sanitary T connection 16. The T connection 16 comprises an outer tube 17 concentric with and spaced outwardly from the inner blending tube 11 and a right angular connecting member 18 connected to a pipe 19 by a threaded nut 20 and gasket 21, or other suitable means of connection. The member 18 can join the tube 17 at any angle and may be concentric with the tube 17. The pipe 19 is connected to a source of pressurized semi-fluid mass (diagrammatically indicated at 22). The semi-fluid mass preferably is ice cream or other edible foodstuff, such as pie fillings and the like.

Sanitary gaskets 23 held in place by cap members 24 threaded to the ends of the outer tube 17 close the top and bottom ends of the outer tube 17 and form seals around the inner tube 11 between which the zone of perforations 15 is positioned.

The parts are preferably constructed of stainless steel to meet the high standards of the dairy industries and the various code requirements.

The particulate material supplied to the storage container 14 and to the blender 10 is prepared in a unique fashion shown diagrammatically in the drawing. A supply of material to be frozen is housed in a supply tank 25 and extruded through a single orifice or a perforated plate 26 so that spaghetti-like ribbons 27 are passed into a container 28 of liquid nitrogen or other cryogenic refrigerant; the term "cryogenic refrigerant" being intended to mean any refrigerant material having a normal vaporization or sublimation point below minus 100° F. The ribbons 27 are substantially instantly frozen into rigid, brittle strips which are broken by simple stirring with a mechanical stirrer 29 into segments of the proper size for blending. The sized particles are stored in the insulated storage chamber 14, or may be passed directly into the blender funnel 14a, if desired. As used hereinafter, the term "cryogen" is intended to mean any particulate material which has been cooled to a temperature below minus 100° F.

In the operation of the blender 10, the deeply frozen or subcooled particles or cryogens are passed from storage 14 (or directly from the nitrogen bath chamber 28) into the funnel 14a and are positively fed by the screw-like action of the auger 12 into the inner blending tube 11. The pressurized semi-fluid mass is passed from the container 22 through the conduit 19 into the outer tube 16 and around the outer surface of the blending tube 11. The material is forced through the perforations 15 into the blending tube 11 and is there mixed with the subcooled particles or cryogens by the rotary motion of the auger 12. The blended material is positively forced through the blending tube 11 and out the end thereof into suitable containers 30 in which it is further cooled to shipping or storage temperatures.

The area of the pipe wall openings 15 should be about the same as the area of the inlet branch 18 of the T 16 to get the proper feed of the semi-fluid material to the inside of the inner tube 11. The amount of feed of particulate material into the tube 11 is usually less than about 50% of the feed through the conduit 19 to prevent freeze-up of the auger 12. With other particulate material, even higher percentages of additives may be used. The auger 12 rotates on the inner surface of the tube 11 which acts as the bearing surfaces therefor.

Suitable additives include frozen fruits or berries, frozen purees, nuts or chocolate or other desirable additives to a semi-fluid mass.

The present invention obviates the tendency of the colder particles to cause the semi-fluid mass to thicken and/or adhere to the inner surface of the blending tube and thus cause the blending operation to fail.

The deeply frozen additive is at $-100°$ F. or lower and preferably the additive material is frozen using liquid or gaseous nitrogen and the resultant frozen material is broken into the proper size particles for blending. Ice creams blended in this fashion tend to have better flavors, textures, and the like. Although the invention has been described for ice cream, other suitable semi-fluid material, such as pie fillings and the like, may be blended with suitable additives using the present apparatus. In general, the present apparatus and process are suitable for use with all types of foods embodying a viscous semi-fluid base into which particulate material is incorporated. The base material and the particulate material may be frozen or non-frozen.

This invention is intended to cover all changes and modifications of the examples of the invention herein chosen for purposes of the disclosure, which do not constitute departures from the spirit and scope of the invention.

What is claimed is:

1. A process of forming and blending deep-frozen particles with a semifluid mass including the steps of:
    (a) extruding ribbons of edible material,
    (b) immersing said ribbons in a bath of cryogenic refrigerant to deeply cool the edible material below its normal freezing point,
    (c) breaking said ribbons within said bath to form a plurality of individual particles,
    (d) passing said individual particles through a tube,
    (e) injecting said semifluid mass under pressure into said tube at a plurality of points, and
    (f) rotationally blending said particles into said mass while scraping the interior surface of said tube.

2. The process of claim 1 wherein said cryogenic refrigerant is liquid nitrogen.

3. A blending apparatus comprising a hollow member, said member including first and second tubular portions joined at an angle to form a T, a hollow tube concentrically positioned within said first tubular portion, said tube being of smaller diameter than said first tubular portion whereby said tube and first tubular portion define an annular chamber therebetween, seal means closing the ends of said annular chamber, said tube having a zone of perforations intermediate said seal means, said second tubular portion communicating with said annular chamber surrounding said zone of perforations, an auger positioned within said tube and extending through said zone of perforations, inlet means for supplying particulate material to the interior of said tube in contact with said auger, means for rotatng said auger, and means for supplying a semifluid material under pressure to said second tubular portion for passage through said perforations into the interior of said tube into contact with said auger.

4. A blender comprising: a first tube, a second tube spaced from and surrounding at least a portion of the length of said first tube so as to form an annular chamber between said tubes, means closing the ends of said annular chamber, a plurality of perforations in said first tube, said perforations forming flow passages from said annular chamber into the interior of said first tube, an auger mounted for rotation within the interior of said first tube, said auger having blades located in the region of said perforations, means for rotating said auger, first inlet means for introducing a first material into the interior of said first tube, second inlet means for introducing a second material into said annular chamber under pressure whereby said second material flows through said perforations and is blended with said first material by rotation of said auger, and outlet means for discharging the blended material from the interior of said first tube.

5. The blender as claimed in claim 1 wherein said auger blades are in continuous scraping engagement with the interior surface of said first tube.

6. The process of forming a frozen food product including at least two edible constituents blended together comprising the steps of:
    (a) passing a first edible material in thermal heat exchange with a cryogenic refrigerant having a temperature below minus $100°$ F. so as to form a plurality of solid cryogens having a temperature substantially below the freezing point of said first edible material,
    (b) passing said cryogens through a chamber along a first direction,
    (c) laterally injecting a second edible material into said chamber at a plurality of points spaced along said first direction,
    (d) rotationally blending said cryogens into said second material within said chamber so as to disperse said cryogens throughout said second material and,
    (e) continuously forcing said blended cryogens and second material out of said chamber as said product.

References Cited by the Examiner

UNITED STATES PATENTS

| | | | |
|---|---|---|---|
| 1,426,555 | 8/1922 | Doering | 62—74 |
| 2,389,084 | 11/1945 | Routh | 107—1 |
| 2,479,261 | 8/1949 | Reetz | 107—54 |
| 2,784,567 | 3/1957 | Reynolds | 62—64 X |
| 3,014,437 | 12/1961 | Dutchess | 107—1 |
| 3,181,838 | 5/1965 | Johansen | 259—8 |

WALTER A. SCHEEL, *Primary Examiner.*

IRVING BUNEVICH, J. SHEA, *Assistant Examiners.*